Nov. 17, 1936.   W. E. SPINDLER   2,061,409
HANDLE MOUNTING FOR KITCHENWARE
Filed Dec. 30, 1935

INVENTOR
Walter Edward Spindler
BY
Wheeler, Wheeler and Wheeler
ATTORNEYS

Patented Nov. 17, 1936

2,061,409

UNITED STATES PATENT OFFICE 2,061,409

HANDLE MOUNTING FOR KITCHENWARE

Walter Edward Spindler, Manitowoc, Wis., assignor to Aluminum Specialty Company, Manitowoc, Wis., a corporation of Wisconsin Application December 30, 1935, Serial No. 56,600

2 Claims. (Cl. 16—119)

This invention relates to improvements in handle mountings for kitchenware.

I have chosen to illustrate the invention with respect to a coffee pot, but the invention is also applicable to many other utensils.

It is the primary object of the invention to provide a novel and improved handle mounting of such a character as to greatly facilitate the application of the handle to the utensil. It is my purpose to mount the handle to a special carrying plate and subsequently to apply the carrying plate to the utensil in but one operation. It has previously required three operations to connect a handle of this general type with a utensil, and the present invention not merely saves time, but it also preserves the appearance of the receptacle as compared with any handle mounting requiring a greater number of operations.

In the drawing.

Like parts are identified by the same reference characters throughout the several views.

Figure 1:
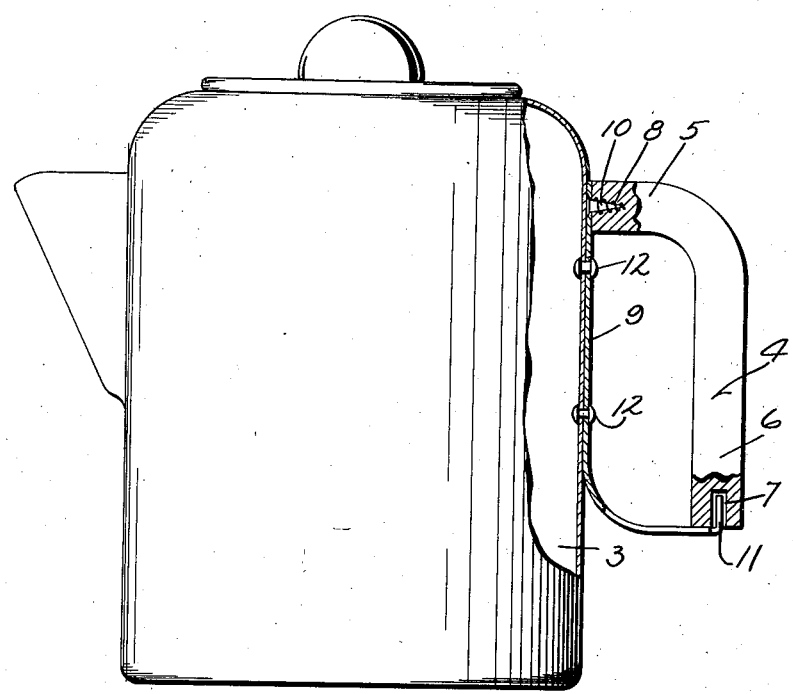
Figure 1 is a view partially in side elevation and partially in section showing the completed application of a handle to a receptacle.
Figure 2:
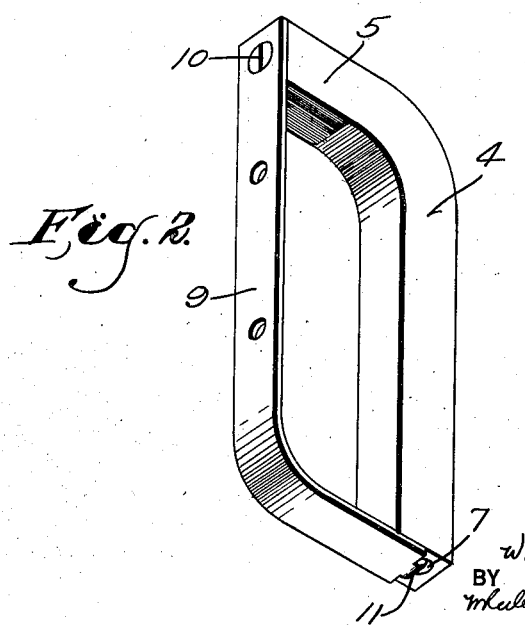
Figure 2 is an enlarged detail view in perspective showing the handle and handle mounting in assembly in readiness for application to the utensil.

The coffee pot or other receptacle is indicated at 3. The handle 4 is in the form of an inverted L having a short leg 5 and a long leg 6. This handle may be made of any convenient or usual material such as wood, composition, porcelain, rubber, or a plastic material.

At the end of the longer leg 6 of the handle is a socket 7. At the end of the shorter leg 5 is a screw hole 8. The mounting member 9 is likewise in the form of an L. In its longer leg is countersunk the head of the screw 10 which engages the shorter leg 5 of the handle. The shorter leg of the mounting member has an upturned integral finger at 11 which is received into the hole 7 of the handle. The assembly is made by simply inserting the finger 11 in the hole 7 and subsequently inserting the screw 10. The assembly is then mounted on the receptacle 3 by means of one or more rivets at 12. The riveting may be completed in a single operation, thus avoiding any undue injury to the finish of the previously completed receptacle.

I claim:

1. A handle and bracket assembly for a utensil, said assembly including a bracket having a long upright arm provided with means for attaching it to a utensil, and an integral short laterally projecting arm at its bottom, a generally upright handle having a short laterally projecting arm at its upper end, a screw extending through an upper portion of the upright arm of the bracket outwardly and engaged with the end of said short handle arm, and connecting means extending upwardly from the short laterally projecting arm of the bracket and embedded in the lower end portion of the handle, said handle bearing directly upon the short arm of the bracket and being dependent upon said connecting means substantially solely for resistance to lateral displacement upon said short bracket arm.

2. A handle and bracket assembly for a utensil, said assembly including a bracket having a long upright arm provided with means for attaching it to a utensil, and a short arm projecting laterally from its lower end portion, a generally upright handle having a short arm projecting from its upper end portion toward the upper end portion of the long bracket arm, connecting means extending in a generally lateral direction and securing said short handle arm to the upper end of the long bracket arm, and connecting means extending in a generally vertical direction and connecting the short bracket arm with the lower end portion of the handle.

WALTER EDWARD SPINDLER.